Nov. 12, 1957  T. J. MESH ET AL  2,812,928
ELECTRONIC LEVEL-SENSITIVE APPARATUS
Filed Jan. 13, 1955
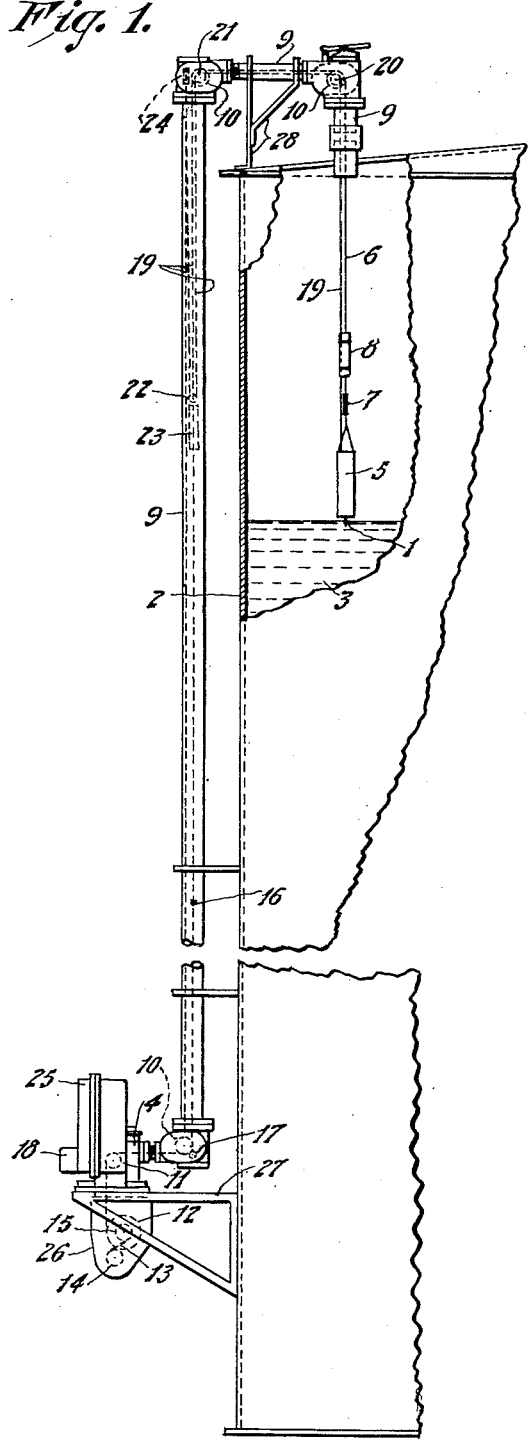
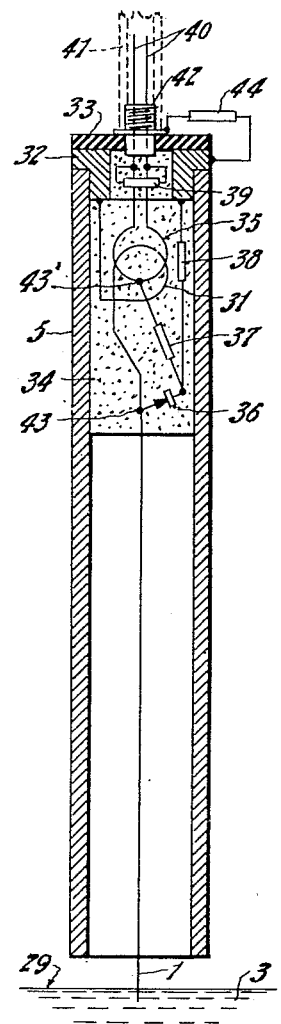
INVENTORS,
Theodore J. Mesh and
George D. Robinson, Jr.
BY
Chapin + Neal,
Attorneys.

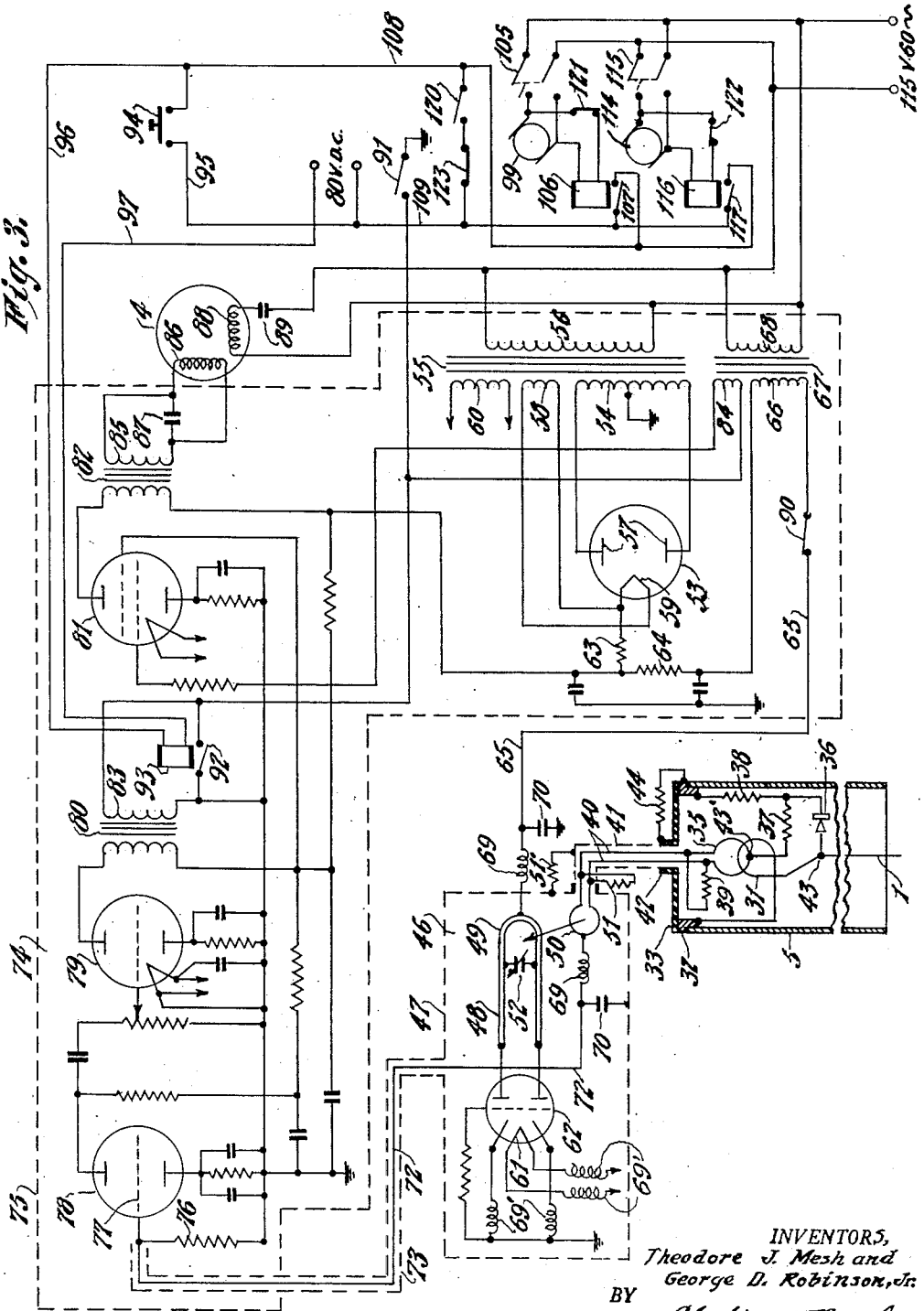

Nov. 12, 1957 T. J. MESH ET AL 2,812,928
ELECTRONIC LEVEL-SENSITIVE APPARATUS
Filed Jan. 13, 1955 4 Sheets-Sheet 3

INVENTORS,
Theodore J. Mesh and
George D. Robinson, Jr.
BY
Chapin & Neal.
Attorneys.

Nov. 12, 1957 T. J. MESH ET AL 2,812,928
ELECTRONIC LEVEL-SENSITIVE APPARATUS
Filed Jan. 13, 1955 4 Sheets-Sheet 4

INVENTORS,
Theodore J. Mesh and
George D. Robinson, Jr.
BY
Chapin & Neal
Attorneys.

United States Patent Office 2,812,928
Patented Nov. 12, 1957

2,812,928

ELECTRONIC LEVEL-SENSITIVE APPARATUS

Theodore J. Mesh, Easthampton, and George D. Robinson, Jr., Agawam, Mass., assignors to Gilbert & Barker Manufacturing Company, West Springfield, Mass., a corporation of Massachusetts Application January 13, 1955, Serial No. 481,502

5 Claims. (Cl. 259—95)

This invention relates to improvements in electronic level-sensitive apparatus for use with containers of liquid for the purpose of indicating the level of liquid therein.

The invention, while capable of general application, finds one advantageous use in connection with the level-measuring apparatus of large storage tanks, such as are used at refineries and bulk plants, for example, to store various petroleum products. It is usual to have a large number of these storage tanks grouped at one location and controlled from another and remote location, where one operator is able to connect a single level-indicating instrument with any desired tank of the group. In storage tanks for this particular use, conditions sometimes arise that cause agitation of the liquid, such for example, as high-speed filling, the mixing of various components of the liquid by circulating the latter in the tank, and the oxidation of certain undesired components by the introduction into the liquid in the tank of jets of compressed air. These conditions make desirable some of the improvements of this invention.

The invention has to do with that class of level-indicating apparatus, wherein an electronic level-sensing element is mounted for vertical movement in the storage tank and made to follow the liquid level up and down by means of a reversible two-phase motor. This motor is controlled electronically from the level-sensing element. When this element and the liquid level are in one predetermined vertical relationship, the motor is stopped. Any change in such relationship will cause the motor to be actuated in one direction or the other as may be necessary to effect a corrective movement of the element back into the predetermined relationship. The normal condition then is for the level-sensing element and the liquid level to move together in a predetermined close vertical relationship, the element being movable only by a change in the liquid level.

One example of an apparatus of the class described will be found in the Mesh and Tapp Patent No. 2,682,026, granted June 22, 1954, to the assignee of the present invention.

This invention has for its general object the provision of means, whereby the level-sensing element of an apparatus of the class described may be moved, either manually or automatically, without requiring any change in level of the liquid in the storage tank or other container.

The arrangement enables an operator, located remotely from the storage tank, to check the invisible level-sensing means by causing the level-sensing element to be lifted above and dropped back to the liquid level one or more times. If the operator's level-indicating instrument reads the same each time, the operator will be satisfied that the apparatus is functioning properly.

The invention has for another object the provision of means for automatically raising the level-sensing element above the level of liquid in the tank, whenever splashing of the liquid is liable to occur, as for example, during high speed filling of the tank or during the circulation of the liquid in the tank for any of various reasons.

The invention will be disclosed with reference to the one illustrative embodiment of it in the accompanying drawings, in which, Fig. 1 is a small-scale fragmentary, sectional-elevational view of an oil storage tank equipped with an electronic level-sensing apparatus, including a movable level-sensitive element, and a means, embodying the invention, for raising such element when desired independently of variations in the level of liquid in the tank;

Fig. 2 is a sectional elevational view, drawn to a larger scale, of the level-sensing element;

Fig. 3 is an electrical wiring diagram of the apparatus;

Figure 5:
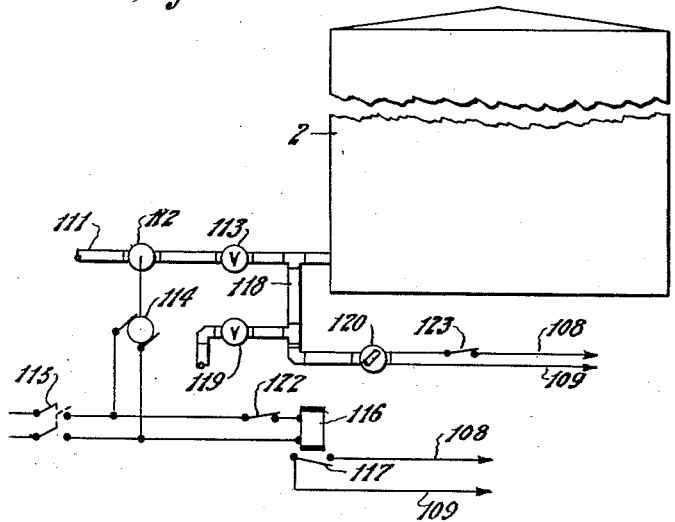
Figure 6:
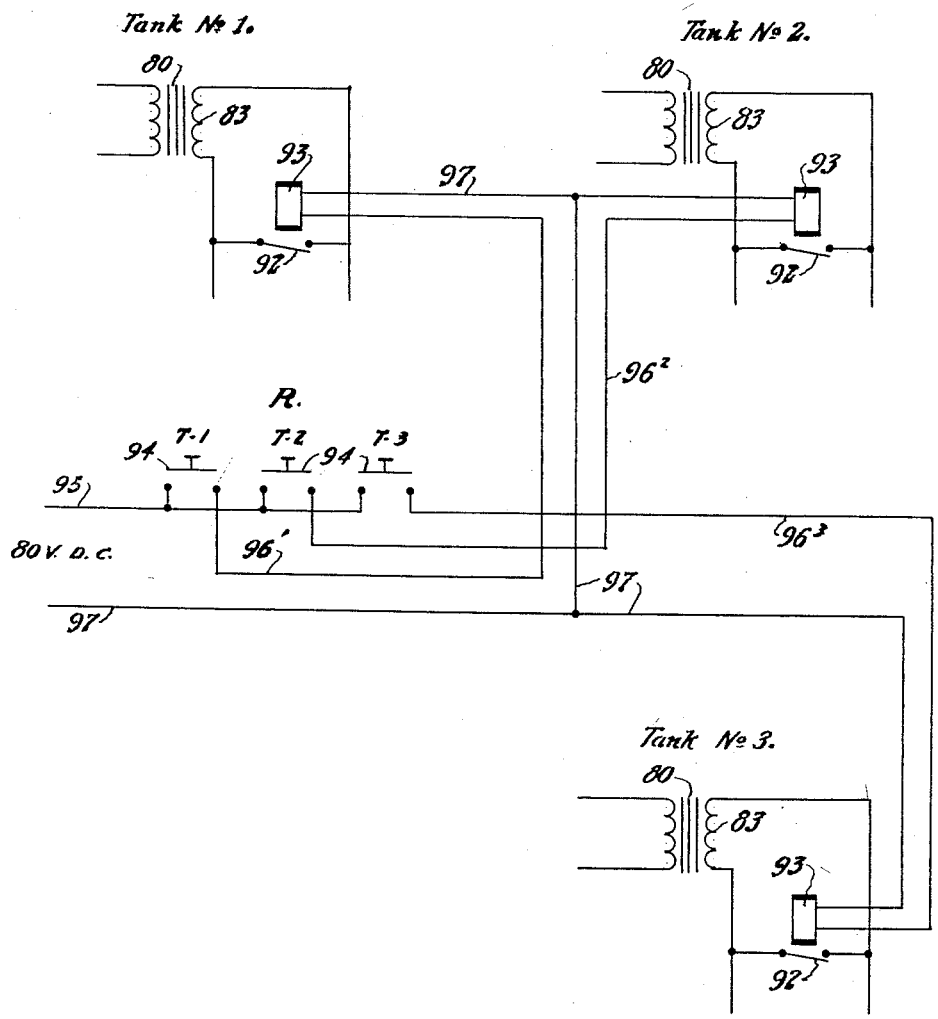

Fig. 5 is a diagrammatical view showing two other forms of automatic control of the means for raising the level-sensing element independently of variations in the level of liquid in the tank; and Fig. 6 is an electrical wiring diagram illustrative of remote control of the means for raising the level-sensitive elements of a plurality of tanks independently of variation in the level of liquid therein.

Referring to these drawings and first to Fig. 1 thereof, we have shown as a level-sensing element, a wire 1, such as is disclosed in the above-named patent. This wire is mounted in upright position in the storage tank 2 and its lower end is adapted normally to be maintained immersed to a predetermined depth in the liquid 3 in the tank. The wire 1 is movable in response to changes in the level of liquid under the control of a reversible two-phase electric motor 4, which in turn is controlled by a signal, derived from the level-sensitive element by any change in the predetermined vertical relationship between the element and the liquid level and caused to effect a corrective movement of the element by raising or lowering it as may be necessary to restore the desired predetermined vertical relationship of the element and liquid level.

As shown herein, the wire 1 is mounted within a tubular metallic shield 5 which is suspended from one end of a perforated tape 6, having interposed therein an insulating link 7 and a weight 8. This tape extends upwardly through the top of tank 2 into and through a conduit housing 9, which is fixed exteriorly of the tank and in which the tape is guided by means of a series of idler rolls 10 to a driver 11, usually a sprocket or pin wheel having teeth or pins to engage in the perforations of the tape. The driver 11 is actuated from the motor 4 through suitable reducing gearing (not shown) to cause the tape to move at the desired low speed, in this case at a maximum rate of 8 inches per minute. The other end of tape 6 is fixed to a drum 12, actuated by a spring 13, the ends of which are fixed one to each of two drums 14 and 15, the drum 15 being fixed to the winding drum 12. The spring 13 tends to turn drum 12 in a direction to wind up the tape 6 and thus raise the level-sensing element 1, while the weight 8 tends to lower such element whenever permitted by the motor 4, which as above set forth, is actuated in response to variations in the level of liquid in the tank. The extent of raising of the element 1 is limited by a stop pin 16, which is fixed to the tape 6 and is adapted to be arrested by engaging in the bight between the lowermost idler roll 10 and a supplementary idler roll 17. The tape 6 is thereby stopped before the liquid 3 rises to the top wall of the tank. When the tape is thus stopped, the motor 4 stalls.

The driving wheel 11 is usually also made to operate suitable potentiometers (not shown) which form part of a telemetric system for transmitting the level indications to a remote location. A level indicator 18 is located adjacent the motor 4 and is suitably driven from roll 11.

One example of a level-indicating apparatus having the potentiometers, a level indicator, similar to 18, a winding drum and springs and a perforated tape will be found in the Tapp and Robinson Patent No. 2,625,043, granted January 13, 1953, to which reference may be had for a more complete disclosure if necessary or desired.

Associated with the level-sensing element 1 is a radio-frequency cable 19 having an insulating jacket. This cable extends upwardly into the described housing 9, around an idler roll 20 then horizontally outward to an idler roll 21 and thence downwardly to a roll 22, actuated by a weight 23 and thence upwardly to the top of the housing, where it is suitably clamped as indicated at 24, to the housing. From the clamp 24 the cable passes downwardly and then outwardly into a box 25 which houses the electronic equipment later described. This control box, the motor 4, and a box 26, which houses the winding spring 13 and associated drums, are all supported from a shelf 27 suitably fixed to tank 2 near the base thereof. The housing 9 is supported from the top of tank 2 by the bracket 28 and from the motor 4.

The sensitive element 1 and its associated elements are mounted as shown in Fig. 2. The sensitive element itself consists of a suitable length (in this case about 20 inches) of wire, which is electrically resonant at some predetermined high frequency, as for example, 160 megacycles. This wire, which may be of any desired cross sectional shape, is disposed substantially vertically within its tubular metallic shield 5 and its lower and sensitive end extends beyond the lower end of the shield and is adapted to be immersed in the liquid 3. The lower end of wire 1 is maintained, within close limits, a predetermined distance below the surface 29 of the liquid, such predetermined spacing being maintained by means, such as described in connection with Fig. 1. The wire 1 has a coupling loop 31 formed near its upper end and such end is connected to a metallic bushing 32, which is suitably fixed in the upper end of the tubular shield 5 and has attached thereto an insulating disc 33, closing the upper end of the tube. The suspension means, such as indicated in Fig. 1, is usually attached to the bushing 32. In the upper end of the tube 5, is a wire loop 35, mounted in fixed coupling relation with loop 31; a rectifier or detector 36, which is preferably of the crystal diode type, such as a silicon diode for example; resistors 37, 38 and 39 and certain electrical connections. The ends of coupling loop 35 connect with the wires 40 of the radio-frequency cable 19 which is provided with a shield 41 (shown completely in Fig. 3), and the lower end of which is connected to a metallic fitting 42 fixed to disc 33. The detector 36 has one terminal electrically connected to the resonant wire at the point 43. Its other terminal is electrically connected through a coupling resistor 37, having in this case a resistance of 20,000 ohms, to the midpoint 43' of coupling loop 35 and through a load resistor 38, having in this case a resistance of 4700 ohms, to the bushing 32 and shield 5. When a signal is impressed on the resonant wire 1, by means to be later described, a fraction of the signal voltage is transmitted to the detector 36. The resistor 39 is an ordinary terminating resistor of 100 ohms resistance coupled across the wires 40 of the radio-frequency cable for the purpose of damping out standing waves on these wires. A resistor 44, also of 100 ohms resistance, is connected to bushing 32 and to fitting 42, which is electrically connected to the shield 41 of the radio-frequency cable, is used to damp out standing waves on such shield. The values given are illustrative of some that have been found suitable and not as imposing limitations. The wire 1 and the described parts associated with it within shield 5 may be held in place by casting resin, indicated at 34, as filling the upper part of the interior of the shield.

The electronic apparatus whereby a signal, which is derived from wire 1 by a variation in the normal vertical relationship between the lower end of the wire and the level 29 of the liquid in tank 2, is made to control the two-phase motor 4, is shown diagrammatically in Fig. 3. A high frequency signal is impressed on the element 1 by any suitable means, such as the oscillator 46, which is of well known form and the parts of which are entirely enclosed within a suitable shield, indicated by the dotted lines 47. This is a low-power oscillator having a frequency range sufficient to include the natural frequency at which wire 1 is resonant. The plate circuit coil of the oscillator consists of a piece of copper tubing 48, the semi-circular end of which forms a coupling loop 49. This loop is loosely coupled by an adjustable loop 50 to the transmission wires 40, above described, and thus to loop 35, which is coupled as heretofore described, to the loop 31 of the resonant wire 1. 51 is an ordinary terminating resistor of 100 ohms bridged across the wires 40 to eliminate standing waves on the wires and 51' is a resistor of 100 ohms connected between the shield 41 and the grounded shield 47 to eliminate standing waves on the shield. The tank circuit of the oscillator includes a variable condenser 52, by means of which the oscillator can be tuned to resonance with the sensitive element 1. Power for the oscillator is derived from a full-wave rectifier 53, supplied from one secondary 54 of a transformer 55, the primary 56 of which is connected as indicated to a suitable source of alternating-current. The mid point of secondary 54 is grounded and its ends are connected one to each of the plates 57 of the rectifier. The transformer 55 also has a secondary 58 to supply current at 5 volts to the cathode 59 of the rectifier and a secondary 60 to supply current at 6.3 volts to the heating filament 61 of the oscillator tube 62. The rectifier 53 supplies the 300 volt direct current needed for the amplifying means to be later described and this voltage is reduced to the 200 volts needed for the oscillator by means of resistors 63 and 64, included in series in a wire 65, which connects the cathode 59 of the rectifier to the plate loop 49 of the oscillator. Included in series in the wire 65 is the secondary 66 of a transformer 67, the primary 68 of which is connected to the above-mentioned alternating current source. This secondary 66 supplies 60 cycle alternating current at 70 volts to effect a fifty percent modulation of the high frequency signal produced by the oscillator. The connection 65 to the oscillator includes a small radio-frequency choke 69 and is connected to one side of a by-pass condenser 70, the other side of which is grounded. Another radio frequency choke 69 is included in the wire connection 72 to loop 50 and this wire is connected to one side of another by-pass condenser 70, the other side of which is grounded. The wire 72 has a shield 73 connected to the shield 47 of the oscillator. Similar small radio-frequency chokes 69' are inserted in the supply wires of filament 61 and in the ground connection of cathodes 71. The oscillator is tuned to resonance with the wire 1, before its lower end becomes immersed in the liquid. A minute amount of power, say for example of the order of 1/100 of a watt, is transferred to wire 1, when the latter is in resonance, and at a low voltage, say for example in the neighborhood of one volt. This unimmersed position, in which wire 1 is tuned to resonance, is not a normal working position but merely a preliminary tuning position, which is followed by immersion of the wire, as it is moved downwardly until its lower end has penetrated into the liquid. Then the liquid causes substantial decrease in signal voltage chiefly by detuning the resonant wire and also by its presence in the field of the wire. The signal will decrease in value approximately in direct proportion to the extent of immersion of the wire in the liquid, until a certain limit is reached (at about 1/8 inch) when the signal completely disappears. The detector 36 derives a portion of the signal from the resonant wire 1 and transmits it through the wires 40 of the radio-frequency cable to a wire 72, the high frequency components of the signal being excluded, by the choke 69 and by-pass condenser 70.

The wire 72 is connected to a suitable amplifying means 74, herein comprising the elements represented within the shield enclosure indicated by dotted lines 75. The shield 73 of wire 72 is connected to the shield 75. Wire 72 is connected to one terminal of the input control resistor 76 and to the grid 77 of an amplifier tube 78. The other terminal of the resistor 76 is grounded to the shield 75. This amplifying means is of conventional form, designed for amplification of 60 cycle current with maximum efficiency. Only the alternating current component of the detected signal is amplified. The amplifying means comprises a preamplifier circuit having two triode stages, using the tube 78 and a tube 79; a power amplifier circuit, including the power amplifier tube 81; an output transformer 82; and an interstage transformer 80 the primary of which is included in the preamplifier circuit and the secondary 83 of which is included in the power amplifier circuit. The amplifier is supplied with 300 volt direct plate current from the full-wave rectifier 53. A gain of about 2000 is effected, providing across the secondary 83 a 60 cycle signal of approximately 50 volts when the wire 1 is in resonance. The transformer 67 has a secondary 84 from which a 60 cycle voltage is derived and applied in series with the secondary 83 in the grid circuit of the power amplifier tube 81. The secondary 66, which supplies the 60 cycle alternating current modulation for the oscillator, and the secondary 84, which supplies adjustable 60 cycle alternating current bias for the power amplifier grid are so connected that the signal across the secondary 83 is opposite in polarity to the alternating current derived from secondary 84. The signal across secondary 83 may, for example, vary from a maximum of about 50 volts, when the sensitive element 1 is in resonance, to zero, when the element is immersed to the predetermined depth in the liquid. The voltage derived from secondary 84 may, for example, be constant at say 15 volts. The differential voltage is amplified, say 20 times, in tube 81 and reduced one-half in transformer 82, appearing in the secondary 85 thereof as at least 150 volts, when the wire 1 is in resonance. The secondary 85 is connected to one winding 86 of the two-phase motor 4, and has bridged across it a power-factor correction condenser 87. The other winding 88 of the motor is connected to the 115 volt, 60 cycle alternating current supply through a condenser 89. When the wire 1 is in resonance, the 60 cycle current supplied to winding 86, will cause the motor 4 to turn in the direction necessary to lower the wire 1. As the wire 1 is lowered toward the surface of the liquid it is immersed therein to various degrees and the signal, derived and amplified as described, will decrease and eventually the signal voltage across secondary 83 will equal the voltage derived from transformer secondary 84 and the differential voltage becomes zero, when the motor 4 will stop with the wire 1 immersed to the predetermined extent in the liquid. Now, if the level of the liquid rises, the voltage across secondary 83 will become less than that derived from secondary 84 and the differential voltage applied to winding 86 will be in an opposite direction, whereby the motor will reverse and lift the wire 1 until a balance is again obtained.

The apparatus, as thus far described, is substantially the same as disclosed in the first-named patent. The motor 4 is controlled electronically from the level-sensitive element and caused to move the latter up or down as is necessary to maintain the desired predetermined vertical relationship between the lower end of such element and the liquid level 29. The result is effected by varying one of two voltages supplied in opposing relation to one winding of the two phase motor 4. One of these voltages is varied by movement of the level-sensitive element and this may be done by any suitable means of which those above described form one illustrative example.

In such an environment, this invention provides means for moving the level-sensitive element independently of variations in the liquid level and, particularly, for lifting it above such level. To effect this result, one of the two opposing voltages (that controlled by a level-sensitive element 1) is inhibited from the circuit of the motor winding 87. This may be done in various ways. The circuit, which supplies the alternating current for modulating the signal may be opened, as by a switch 90 interposed in the wire 65. Another and preferred way, is to close a shunt circuit across the terminals of the secondary 83. This may be done by closing a switch 91, the terminals of which are connected to the terminals of secondary 83 whereby the latter is short circuited. No harm results from the short-circuting of the secondary 83 because the power level at this location is only a fraction of a watt. The switches 90 and 91 are presumed to be located at the storage tank. For remote operation, a relay is provided at the tank and the terminals of its switch 92 are connected across the terminals of secondary 83. This switch 92 is arranged to be closed by energization of the magnet 93 of the relay and such energization is controlled by a push button 94 located at the remote point. The magnet and the push button are connected in a series circuit, which comprises the wires 95, 96 and 97, and which is connected to a suitable supply of direct current, as indicated. Closure of switch 94 will energize the magnet 93 and close switch 92, which short circuits the secondary 83. Closure of switch 91 will effect the same result without the aid of a relay. In either case, the voltage produced in the secondary 83 is prevented from opposing the voltage produced in secondary 84 and the motor 4 will be actuated to raise the level-sensitive element at the maximum rate (in this case 8 inches per minute) away from the liquid level. This lifting movement will continue as long as the switch 91 or 92 is held closed up to the limit of upward travel permitted by the described stop 16, when the motor 4 will be stalled. The same result will be effected by opening the switch 90 which cuts out the alternating current used for modulating the signal derived from the level-sensitive element.

One advantageous use of the described arrangement is in enabling the operator to readily check the level measuring apparatus, all parts of which are invisible except the indicating instrument, and satisfy himself that the apparatus is functioning properly. For example, he may read the level on the indicating instrument and then actuate one of the switches 90, 91 or 94, to raise the level-sensing element 1 above the level 29 of the liquid 3. Then he may release the switch and allow the element 1 to move back. He may then read the level on the indicator and if this reading is the same as the first, the operator will be satisfied that the apparatus is working properly. The operator may thus "jog" the element 1 up and down several times to make sure that it always returns to the same level. For this use, the element 1 would normally be raised only short distances and for short time intervals and the raising would be manually controlled, either at the storage tank or, more usually, at a receiving station located remotely from the tank.

Figure 4:
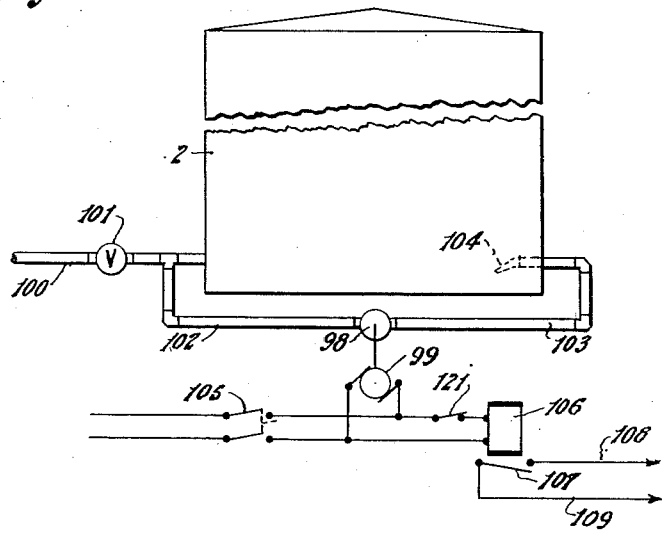
Fig. 4 is a diagrammatical view showing one form of automatic control of the means for raising the level-sensing element independently of variations in the level of the liquid in the tank.

Under certain conditions, it may be desirable to raise the element 1 by greater distances, as to the top of the tank, to avoid the splashing which may sometimes occur and may adversely effect the level-sensing element, and to maintain the element raised for relatively long intervals until the splashing has ceased. Also, it may be desirable to effect the raising of the element 1 automatically, when the adverse condition prevails. For example, as shown diagrammatically in Fig. 4, the storage tank 2 may be equipped with a pump 98, driven by an electric motor 99 and adapted to circulate liquid in the tank. As shown, the pipe 100, through which the petroleum products are forced into or drawn out of the tank, has a valve 101 therein. This pipe 100, at a location between valve 101 and the tank, is connected by a pipe 102 to the inlet of pump 98. The outlet of the pump is connected by a pipe 103 to the tank, terminating inside the latter with an agitator jet 104. If valve 101 is closed and the motor 99 started by closing switch 105, the liquid in the tank will be circulated, as for example for the purpose of mixing various components of a fuel mixture previous to withdrawal. In parallel with the motor 99 is the magnet 106 of a relay having a switch 107, the terminals of which are connected, as shown in Fig. 3, by wires 108 and 109 to the described wires 96 and 95, to which switch 94 is connected. Hence, closure of switch 107, which occurs whenever motor 99 is energized, will cause relay magnet 93 to be energized and the switch 92 closed to short circuit the secondary 83. Hence, the level-sensing element will be raised by motor 4 and this will usually continue until the element 1 reaches its uppermost position.

In Fig. 5, the tank 2 has an inlet pipe 111 and interposed therein is a pump 112, which may at times be operated at high speed, and a valve 113. The pump 112 is driven by an electric motor 114, when the switch 115 is closed to connect it to the alternating current supply. In parallel with motor 114 is the magnet 116 of a relay having a switch 117, the terminals of which are connected, as shown in Fig. 3, to wires 108 and 109 and thus in parallel with the switches 84 and 107. Thus, when motor 114 is energized, the magnet 116 will be also, thereby causing motor 4 to raise the level-sensing element out of the path of the splashing liquid fed into the tank at high speed. The great amount of splashing occurs during the initial stages of filling the tank when the pump is usually operated at high speed. During later stages of filling, the liquid becomes more nearly quiescent near the surface and then the level-sensing element may be restored to working condition to indicate the liquid level. The circuit to relay magnet 116 may be opened manually to thus render operative the level-sensing element.

In Fig. 5, there is also shown an arrangement for injecting compressed air into tank 2. This may sometimes be used to oxidize certain undesirable substances in the liquid or for circulating the liquid. Whatever its purpose, agitation of the liquid will be produced with undesirable splashing or wave motion to adversely affect the level-sensing element. A compressed-air supply pipe is shown at 118 which is connected to the intake pipe 111 at location between valve 113 and tank 2 and has a valve 119 therein. On closing valve 113 and opening valve 119, compressed air will be introduced into tank 2. Connected to pipe 118 is a pressure-actuated switch 120, the terminals of which are connected to the described wires 108 and 109 and thus in parallel with switches 94, 107 and 117. Compressed air will cause switch 120 to close and this will energize relay 93 to close switch 92 and short circuit the secondary 83. After the desired amount of compressed air has been introduced into tank 2, valve 119 is closed and valve 113 opened. The drop in pressure will then allow switch 120 to open.

In Fig. 3, all these various expedients described for automatically controlling the raising of element 1 are shown. Any one or more of these expedients may be used as desired. Any expedient not needed or desired may be rendered inactive by opening a switch provided for that purpose. Switches 121, 122 and 123 are respectively interposed in the circuits of relay magnet 106, relay magnet 116 and pressure switch 120 for such purpose.

In Fig. 6, we have indicated schematically the arrangement that would probably be used at a tank farm, wherein a plurality of tanks, marked 1, 2 and 3, are controlled from a central and remotely located receiving station R. At this station, are a series of push buttons 94 one for each tank. Each button 94 is connected to the common supply wire 95 and each relay magnet 93 is connected to the common return wire 97. The push buttons 94 for tanks Nos. 1, 2 and 3 are respectively connected by wires $96^1$, $96^2$ and $96^3$ to the magnets 93 at tanks Nos. 1, 2 and 3. Thus, by touching any button 94, the level-sensing element 1 of any tank of the farm may be "jogged" as above described for the purpose of satisfying the operator that the level measuring apparatus is in working order.

The invention thus provides in electronic level-sensitive apparatus various means for lifting the level-sensing element, either manually or automatically and without necessitating any change in the level of the liquid in the container.

What is claimed is:

1. In an electronic level-sensitive control, adapted for use with containers of liquid and of the type wherein the level-sensing element is movable by a reversible two-phase motor, having first and second windings, and separate first and second circuits respectively supply alternating current in proper phase relation to said first and second windings, the first circuit supplying a fixed voltage of one phase, the second circuit being supplied by a first means with a first and fixed voltage of the other phase tending to actuate the motor to raise said element and by a second means with a second and opposing voltage controlled by and variable with variations in the distance between the element and the level of liquid in the tank and tending to lower said element, said first and second voltages balancing when the element and liquid level are in a predetermined vertical relationship causing the motor to stop, variations in the liquid level causing a change in said second voltage to actuate the motor in one direction or the other to effect a corrective movement of said element to restore the predetermined relationship, and a third means separate from said second means for canceling the second voltage from said second circuit and causing the motor to lift said element independently of variation in the level of the liquid.

2. The combination, as claimed in claim 1, in which a fourth means is located remotely from the container and all the aforesaid means for actuating the third means.

3. The combination, as claimed in claim 1, in which pumping means for liquid are connected to the container and provided with means for starting and stopping the same, and the third means is respectively rendered active and inactive by the starting and stopping of the pumping means.

4. The combination, as claimed in claim 1, in which means are provided for circulating the liquid in the container together with means for starting and stopping such circulating means, and the third means is respectively rendered active and inactive by the starting and stopping of the circulating means.

5. The combination, as claimed in claim 1, in which means are provided for injecting a fluid into the container together with means for starting and stopping such fluid-injecting means, and the third means is respectively rendered active and inactive by the starting and stopping of the fluid-injecting means.

References Cited in the file of this patent

UNITED STATES PATENTS

| | | |
|---|---|---|
| 2,619,620 | Tapp et al. | Nov. 28, 1952 |
| 2,682,026 | Mesh et al. | June 28, 1954 |